United States Patent [19]

Moore et al.

[11] Patent Number: 4,738,834

[45] Date of Patent: Apr. 19, 1988

[54] TREATMENT OF TECHNETIUM CONTAINING SOLUTIONS

[75] Inventors: Phillip W. Moore, Menai; John M. Sodeau, Engadine; Michael Shying, Cronulla; John V. Evans, Lilli Pilli, all of Australia

[73] Assignee: Australia Nuclear Science & Technolog Organization, Australia

[21] Appl. No.: 701,373

[22] Filed: Feb. 14, 1985

[30] Foreign Application Priority Data

Feb. 24, 1984 [AU] Australia .............................. 25032/84

[51] Int. Cl.$^4$ ....................... B01D 15/04; C01G 57/00
[52] U.S. Cl. .......................................... 423/2; 210/677; 210/682
[58] Field of Search ...................... 210/670, 677, 682; 423/2, 49, 6; 250/493.1; 252/645; 502/349

[56] References Cited

U.S. PATENT DOCUMENTS

| | | | |
|---|---|---|---|
| 4,158,700 | 6/1979 | Karageozian | 423/2 |
| 4,280,053 | 7/1981 | Evans et al. | 423/2 |

FOREIGN PATENT DOCUMENTS

| | | |
|---|---|---|
| 1245804 | 9/1971 | United Kingdom . |
| 1414597 | 11/1975 | United Kingdom . |
| 1528153 | 10/1978 | United Kingdom . |
| 1531985 | 11/1978 | United Kingdom . |
| 2000361 | 1/1979 | United Kingdom . |
| 2067343 | 7/1981 | United Kingdom . |

OTHER PUBLICATIONS

Kraus et al, "Ion Exchange Properties of Hydrous Oxides", Proc. 2nd U.N. Intern. Conf. Peaceful Uses Atomic Energy, Geneva, vol. 28, 3–16 (1958).
Evans et al., "A New Generator for Technetium-99 m", Australian Atomic Energy Commission, 1982.

*Primary Examiner*—Ivars Cintins
*Attorney, Agent, or Firm*—Ostrolenk, Faber, Gerb & Soffen

[57] ABSTRACT

An initial aqueous pertechnetate solution which has a low electrolyte concentration compared with physiological saline is treated by passage through a bed of insoluble ion exchange material for adsorbing the pertechnetate. In a second step an ionic eluant having a smaller volume than the pertechnetate solution is passed through the bed to remove the pertechnetate to provide a relatively concentrated and pure eluate solution, the ion exchange material in the bed and the ionic eluant having respective properties for providing the eluate with a pH suitable for radiopharmaceutical purposes. The bed retains thereon radionuclidic impurities which may have been in the initial solution. The method can be valuable for treating the eluate from a portable technetium generator which is eluted with water and advantageously the insoluble material in the bed is zirconium oxide.

9 Claims, 1 Drawing Sheet

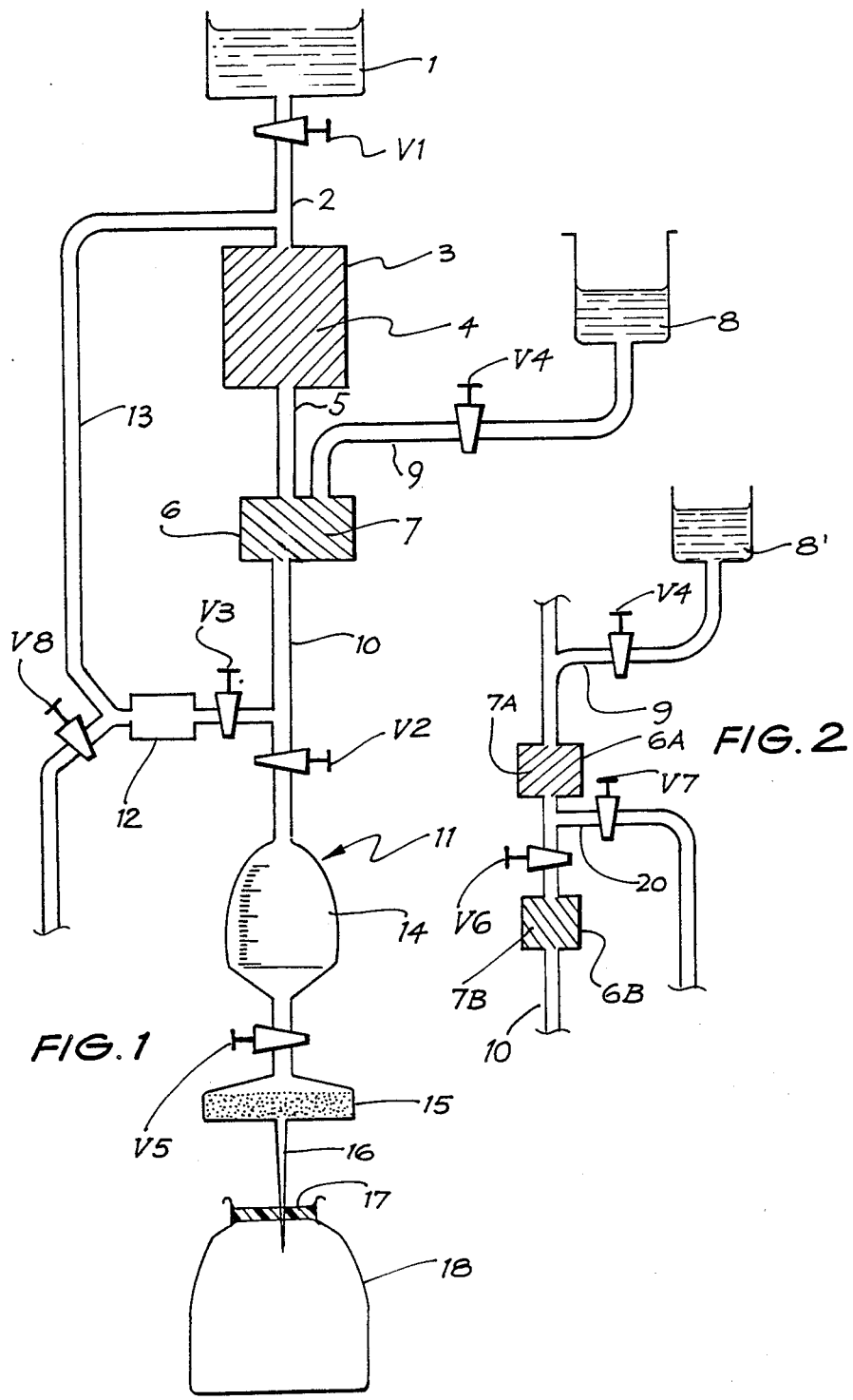

TREATMENT OF TECHNETIUM CONTAINING SOLUTIONS

FIELD OF THE INVENTION

The present invention relates to the treatment of technetium-containing solutions and to technetium generators arranged to produce such solutions which are suitable for medical and other uses.

BACKGROUND OF THE INVENTION

Technetium-99m is an important radionuclide used extensively in hospitals and other establishments. When formulated into various chemical compounds it is commonly used as a diagnostic radiopharmaceutical.

In practice, technetium-99m is obtained as a decay product of its parent radionuclide molybdenum-99. This radionuclide has a half life of 66 hours and decays continuously to yield technetium-99m. Several practical devices known as generators are commercially available which enable the user to separate the daughter radionuclide, technetium-99m (usually in the form of sodium pertechnetate) from the parent radionuclide.

However, technetium-99m has a half life of only 6 hours and due to this relatively rapid decay pertechnetate solutions should be used as soon as possible after preparation. Consequently, there is a market for transportable technetium generators for use at medical clinics. The generators should be capable of operation at these clinics in a manner which is easy and reliable for producing a very pure product. Furthermore, it would be advantageous for many purposes if the product were a solution having a relatively high concentration of technetium-99m.

In addition to transportable chromatographic-type generators, it is also possible to produce pertechnetate solutions in bulk. Providing distribution to user sites can be rapid and there is a relatively high concentration in the solution, a centralised bulk production facility may be a useful approach. However, for many locations there is a need for portable chromatographic generators.

MOLYBDENUM-99 PRODUCTION

Two main methods are known for producing molybdenum-99 for use in a technetium generator:
 (a) fission of uranium 235, and
 (b) neutron activation of molybdenum to convert some of the atoms to the isotope molybdenum-99.

(a) Fission Produced Mo-99

Molybdenum-99 is extracted as a fission product of uranium 235 and this method can produce high specific activity molybdenum-99 suitable for use in a portable chromatographic generator. In this type of generator, molybdenum-99 in the form of a soluble molybdate is adsorbed onto the surface of aluminium oxide arranged in a bed and the technetium-99m, which progressively forms due to decay of the molybdenum-99 may be separated by elution at regular intervals. The elution step comprises passing a solution of physiological saline (0.9% NaCl) which is called the eluant, through the bed of the aluminium oxide. The molybdenum-99 remains on the bed, whilst the technetium-99m enters the liquid phase eluate which issues at the exit point of the generator bed. Conventionally, elution takes place at 24 hour intervals and it has been found that about 7 such elutions can take place before the generator's activity has dropped to such a level it is no longer viable.

These conventional portable chromatographic generators are relatively expensive to produce having regard to the costs of preparing uranium irradiation targets, separating the molybdenum-99 from the other fission products and dealing with the large amounts of long lived radioactive waste. Furthermore, although relatively concentrated eluates can be provided by these generators, there is still a difficult problem to solve, namely providing the desired radionuclidic purity in the eluate. In addition, in commercially practical generators having relatively high specific activity levels, it has been found that secondary effects can substantially reduce the yield. These problems are discussed more fully in Australian patent specifications No. 515,808 equivalent U.S. Pat. No. 4280053) and Australian specification No. 464043.

(b) Neutron Activation Method

A second method of producing molybdenum-99 comprises neutron activation of molybdenum in a nuclear reactor, but this method usually results in a relatively low specific activity product, usually less than 100 GBq/g. Although this method of production can be advantageous in some respects, the material produced if used in a chromatographic generator has the disadvantage of the eluate generally being too dilute for radiopharmaceutical uses. Accordingly, high specific activity fission-produced molybdenum-99 has generally been used for portable chromatographic generators.

A NEW TECHNETIUM GENERATOR

The applicant's U.S. Pat. No. 4,280,053 concerns an alternative and advantageous approach to generator construction and provides a generator in which there is a matrix comprising a mass of polymolybdate compound, the polymolybdate compound being of chemically bound molybdenum containing molybdenum-99 and being in a substantially non-elutable form, and the matrix permitting diffusion of technetium-99m therethrough and elution therefrom. More specifically, the molybdenum compound for forming the polymolybdate with advantage may be any one or more of the following compounds:

zirconium molybdate, titanium molybdate, ceric molybdate, ferric molybdate and stannic molybdate.

The polymolybdate compounds used in the above-mentioned generators can be described as of gel-like form and this type of generator can be just as convenient and simple to operate as a chromatographic generator.

It is now pointed out that such gel-type generators may be capable of using effectively low specific activity material produced by neutron irradiation by incorporating into the polymolybdate gel a molybdenum-99 content much higher than is possible in the adsorptive bed of conventional chromatographic generators. Furthermore, it has been found that the gel-type generators are capable of elution with either water or saline, unlike chromatographic generators which cannot be successfully eluted with water. A high ionic content solution, usually saline solution, is required to remove the pertechnetate from conventional chromatographic generators.

DESIRABLE FEATURES FOR TECHNETIUM GENERATORS

For many radiopharmaceutical purposes, the technetium-99m concentration in the eluate must be reasonably high and this requirement imposes considerable constraints on the method of manufacture and construction of technetium generators and may prevent the use of techniques which would be economic and convenient techniques. For example, it would be desirable to be able to use in a generator reasonably low specific activity molybdenum-99 which can be obtained by irradiating molybdenum with neutrons for relatively short irradiation times and/or obtained by irradiation in a medium to low flux nuclear reactor, e.g. with a thermal neutron flux of less than about $10^{13}$ n/cm²/sec.

Furthermore, since generators decay continuously and the longest possible working life is required, there is an added problem with relatively low technetium yields if the time taken for processing, manufacture and transport of the generators to the end user exceeds about 2–3 days. Furthermore, the concentration of technetium-99 in the eluate will usually drop as the generator is nearing the end of its useful life. Accordingly, it is desirable for a generator to be designed to facilitate rapid processing, manufacture and transportation at the lowest possible cost.

It is also desirable for technetium-99m generators to provide economic production of very pure, relatively concentrated technetium-99m solutions. Furthermore, the generator should be capable of operation easily by a relatively unskilled technician.

DESCRIPTION OF THE INVENTION AND ITS PERFERRED FORMS

According to a first aspect of the present invention, there is provided a method of treating an aqueous initial pertechnetate solution which has low electrolyte concentration compared with physiological saline, the method comprising passing the initial pertechnetate solution through a bed of insoluble material having ion exchange properties so as to adsorb pertechnetate from said solution, and in a second step passing an ionic eluant having smaller volume than said pertechnetate solution through the bed to remove the pertechnetate from the bed to provide a relatively concentrated and pure eluate solution, the ion exchange material for said bed and said ionic eluant being selected such that said eluate has a pH substantially suitable for radiopharmaceutical purposes and said bed retains thereon radionuclidic impurities which may be present in said initial solution.

Embodiments of the invention may use an ion exchange material which can be said to be amphoteric, i.e. one that can have predominantly cation or anion exchange characteristics, depending upon the pH of the solution passed through the bed.

According to a second aspect of the invention, there is provided apparatus for treating an aqueous pertechnetate solution which has low electrolyte concentration compared with physiological saline and is an eluate from a technetium generator, the apparatus comprising a bed of insoluble ion exchange material capable of adsorbing pertechnetate from said solution when passed through the bed, and capable of being eluted by an ionic solution substantially to cause desorption of the pertechnetate, the ionic solution being of relatively small volume compared with the volume of said pertechnetate solution, means being provided for containing and supporting the bed, first connection means for permitting the introduction of and discharge from the bed of said aqueous pertechnetate solution, and second connection means for permitting the introduction of and discharge from the bed of a relatively small volume of said ionic solution.

The invention extends to the combination of a technetium generator in combination with apparatus as described above whereby the generator eluate is the initial solution passed through the bed, and said ionic elution produces a relatively concentrated technetium solution of high purity and high specific activity.

Various preferred embodiments and options involving further inventive concepts will be described hereinafter.

The invention is especially useful with gel-type generators of the type described in U.S. Pat. No. 4,280,053 but the invention may also be applied to treat eluates derived from other types of generators.

Furthermore, the bed is preferably constructed so as to act as a filter for removing any fine particles which may carry through from the generator bed.

The material of the bed is preferably selected so as to have a very high degree of adsorption of minor radionuclidic impurities in eluates from technetium generators. These impurities are removed by cation and anion exchange yet when the bed is eluted in the second stage, these impurities remained strongly bound into the bed.

An important advantage is that due to cation exchange reactions occurring on the bed, the pH of both water and saline eluates from the bed is automatically adjusted to the desired range of pH 4 to 8.

A principal feature of use of the present invention is that since the bed can be eluted with a relatively small quantity of ionic solutions, a highly concentrated product solution emerges and, furthermore, this solution is of suitable pH and is far more pure than the eluate produced by the original technetium generator. Not only are radionuclidic impurities removed by adsorption onto the bed but fine particles may be filtered out by the bed, and also contaminants such as nitrates in the original eluate remain in the initial solution emerging from the bed and thus are not available to contaminate the final eluate or product solution.

Preferably, the ion exchange material is a suitable insoluble metal oxide and advantageously may be hydrous zirconium oxide. This material has been found to be especially beneficial and can remove very efficiently certain impurities from the initial pertechnetate solution.

The bed may comprise a relatively small quantity of ion exchange material, e.g. of the order of 1 gram and it has been found that such a bed can efficiently adsorb the technetium content of a relatively large volume of aqueous solution, e.g. 200 mls. Furthermore, such a bed has been found to have a very high recovery efficiency of about 90% when the bed is eluted with about 10 ml of saline solution. Thus, a concentration factor of about 18 is obtained and furthermore the original aqueous solution is effectively purified while at the same time the final eluate has its pH affected by the bed to be suitable for radiopharmaceutical purposes.

An important and advantageous feature for use with the present invention is that the bed can be arranged as two distinct bed portions arranged in series for passage of solutions and preferably the portions comprise a smaller bed used upstream of a larger bed. It has been found that adsorption is better in larger beds while desorption is faster from smaller beds. Particularly since a relatively small volume of eluant is to be used, it is desirable that the final elution occurs efficiently so as to remove the technetium adsorbed onto the bed. It has been found that the overall recovery of technetium from using such a configuration of a large and small bed can be up to 15% higher than using a single bed of the same total weight of ion exchange material and the same volume of eluant. Moreover, the technetium concentration in the eluate from the small bed may be two or more times greater than that provided by a single bed.

Another advantageous and useful feature is that after the initial aqueous solution has passed over the bed for adsorption of technetium onto the bed, the aqueous liquid discharged (which may be contaminated with a minor quantity of nitrate as well as having a small degree of radioactivity) can simply be recycled and held for a subsequent elution of the primary technetium generator. This technique reduces the volume of radioactive liquid waste to be handled and can increase the operating efficiency of the generator to a significant and useful extent. Thus, a considerable operating advantage of economic significance can be achieved.

It will be appreciated that embodiments of the invention may be such that the eluate solutions from two or more generators are passed through the bed to accumulate technetium in the bed and, furthermore, the eluate may be recycled through the generator and bed two or more times.

Preferably, the invention is embodied in a system in which a conditioned hydrous inorganic oxide is used for the bed material, a portion of the material being conditioned by treatment with acid and a portion of the material being conditioned by treatment with an alkali, these two portions being mixed to form the material for the bed.

PREPARATION OF CONDITIONED BED MATERIAL

In a preferred embodiment of the invention, hydrous zirconium oxide is used and the method of preparing and conditioning this material for the bed can be as follows:

(a) adding drop by drop ammonia to a solution of a zirconium salt, such as zirconium oxychloride, to cause precipitation of zirconium hydroxide.

(b) filtration of the precipitate and drying at 50°–55° C. to cause the precipitate to change to hydrous zirconium oxide, (c) treatment by water to cause disintegration of the precipitate into finely divided particles, (d) drying the solid at ambient temperature and then sieving the product, (e) treatment of some of this product with 0.05M hydrochloric acid to convert the ion exchange material to the anion exchange form, (f) treating some of the ion exchange material with 0.5M sodium hydroxide so that it is converted to the cation exchange form, and (g) prior to use, the two treated forms of the ion exchange material are mixed and washed with water or saline solution to condition the material to form the material for the bed. For treating the eluate of a portable technetium generator a typical bed will comprise 0.1 to 0.5 grams of a mixture, half of which is anion exchange material and half cation exchange material.

BRIEF DESCRIPTION OF THE DRAWINGS

For illustrative purposes, an example of the invention will now be described with reference to the accompanying drawings, of which:

FIG. 1 schematically illustrates a technetium-99m generator coupled to a concentrating and purifying bed embodying the invention; and FIG. 2 illustrates a modification of the apparatus of FIG. 1.

DETAILED DESCRIPTION OF FIG. 1

The apparatus comprises a technetium-99m generator of the type described in detail in U.S. Pat. No. 515,808 and consisting of a water supply tank 1 connected to a generator inlet tube 2 which leads to a generator bed container 3 having a bed consisting of a polymolybdate matrix 4, and a discharge tube 5. The tube 5 leads to a secondary treatment unit 6 containing a treatment bed 7.

The unit 6 is adapted to receive aqueous (low-ionic) eluate from the tube 5 or, alternatively, a saline ionic solution from a reservoir 8 connected through a secondary inlet line 9. Discharge from the unit 6 is through a discharge conduit 10 which can discharge the solution to a collection arrangement 11 or feed the solution to a recycling pump 12 which will pump the solution through a return line 13 to the generator bed container 3. Alternatively, by opening a discharge valve V8, the solution can be passed to waste.

The apparatus includes valves V1, V2, V3 and V4 adapted to be actuated as required to control fluid flows.

The collection arrangement 11 comprises a graduated container 14 for collecting the final solution and measuring its volume with the discharge from the container 14 being controlled by valve V5, the container leading to a millipore filter 15, the discharge from which takes place through a discharge needle 16 which is adapted to pierce a resilient seal 17 at the opening to an evacuated vial 18.

The bed 7 in this preferred embodiment is of hydrous zirconium oxide comprising a mixture of two components. The first component is hydrous zirconium oxide conditioned by conversion with hydrochloric acid and the second component is hydrous zirconium oxide conditioned by treatment with sodium hydroxide. The mixture is such that the bed has both anion and cation exchange properties.

Typically, the bed 4 is of about 150 gms of gel-like substance and the bed 7 is of about 1 gm of zirconium oxide and by varying the proportions of the cation and anion components of the bed 7, the pH of the eluate emerging therefrom can be varied within limits.

The apparatus is intended to be operated by the passage of a volume of 200 ml of water with a single passage through the generator or, alternatively, 50 ml volume of water may be used, the water being cycled several times through the bed during the first stage of the process.

Operation of Embodiment of FIG. 1

Operation of the apparatus is as follows:

(1) After a period of about 24 hours, as is well known, the concentration of technetium in the generator 3 will have reached a near maximum value and the generator is then eluted with about 200 ml of water from tank 1 by opening valve V1. The water percolates slowly through the polymolybdate matrix removing essentially only technetium in the form pertechnetate which is dissolved in the water and passes down discharge tube 5.

The pertechnetate is rapidly and efficiently adsorbed onto the zirconium oxide bed by ion exchange and the bed has the additional feature of increasing the pH of the aqueous eluate from about pH 2.7 to about pH 4 which is considered to be the optimum pH for efficient absorption and subsequent desorption of the pertechnetate onto and from the bed 7.

By maintaining valve V2 closed and valve V3 open, the aqueous eluate (from tank 1) is passed to pump 12 and returned by line 13 to the tank. If desired the eluate may be recycled through the bed several times to maximise pertechnetate adsorption. The pump 12 operates to recycle the eluate to the bed container 3.

This step of the process causes soluble (unwanted) nitrates in the eluant to remain in the liquid phase together with some radionuclidic impurity components (such as rhenium-186 and rhenium-188) which have only weak affinity to the bed material, whereas the pertechnetate is removed onto the bed by virtue of its strong affinity to bed material. Furthermore other radionuclidic impurities are also removed by the bed 7 and are strongly bound thereto. Examples of such other impurities are molybdenum-99, niobium-92m, zirconium-95, cobalt-60, and tungsten-187. In addition, any fine gel particles from the molybdate matrix 4 are trapped by the bed, 7 which acts as a filter. The gel particles contain molybdenum-99 which would be an undesirable contaminant of the final product.

(2) Desorption from the bed then takes place by elution with saline solution from reservoir 8; valve V4 is opened to admit the solution to the top of container 6 whereby the bed 7 is eluted and rapid removal of the technetium in the form of pertechnetate occurs. However, radionuclidic impurities remain firmly bound to the bed. Valve V2 is opened to discharge the eluate as a concentrated and purified stream into the receiving arrangement 11. The bed is such that the pH of the eluate is also adjusted to a convenient level for radiopharmaceutical purposes. The saline solution when emerging from the bed 7 has a pH of about 6 as a result of cation exchange reactions on the bed.

(3) The cycle can be recommenced after a suitable technetium-99m growth period.

Detailed Description of FIG. 2

FIG. 2 illustrates a modification wherein the unit 6 is substituted by unit 6A shown in FIG. 2 and comprising a smaller bed 7A upstream of and connected in series to a larger bed 7B in series. Typically, the smaller bed will comprise 0.3 gm of conditioned hydrous zirconium oxide and the larger bed 0.45 gm of the same material. Absorption is better with larger beds while desorption is faster from smaller beds and the combination of this configuration permits higher recovery of technetium compared with using a single bed with the same amount of ion exchange material and the same volume of eluant used and provides a means for further increasing the technetium concentration.

As shown in FIG. 2, an optional discharge line 20 extends from the conduit between the beds 7A and 7B so that elution with a small volume of saline from the reservoir 8 can be directed only through the smaller bed 7A, a changeover valve V6 being operated to cause the discharge to pass along the branch 20 and into a collection arrangement when valve V7 is opened. This permits the highly concentrated pertechnetate solution to emerge. Elution of both beds would require usually a slightly larger volume of saline solution in order to remove a large proportion of the technetium from the beds, the volume being sufficiently large that a less concentrated pertechnetate solution will be obtained. Different concentrations of solution may be required for different applications and thus the qualifications of FIG. 2 introduce flexibility for the end user.

In summary, embodiments of the invention can exhibit or utilise the following characteristics:

(a) The final eluate can be given a pH of about 6 which is considered ideal for usage in a radiopharmaceutical.

(b) A very high degree of radionuclidic purity can be obtained in the final eluate and other impurities such as nitrates can be removed by being left in the original aqueous solution.

(c) Eluate from the gel generators may include an undesirably high cerium content; embodiments of the invention can greatly reduce cerium content.

(d) A relatively small volume of water can be used for eluting a gel-type generator with the water recycled through the generator and an ion exchange bed embodying the present invention. This can be an efficient elution arrangement.

(e) Embodiments of the invention can operate at an overall adsorption/desorption efficiency of a very high level with a high degree of technetium-99m in the final saline based eluate. This can be achieved by elution of the gel-type generator with a large volume of water or, alternatively, by recycling a much smaller quantity of water through the generator and bed several times.

(f) The invention may be embodied in an arrangement in which two ion exchange beds are arranged in series, the first being smaller than the second one.

EXPERIMENTAL RESULTS

Experiments have been conducted to demonstrate the desirable results that can be achieved with various embodiments of the invention. Except where otherwise stated in the Example, a zirconium molybdate gel generator was used and eluted with water and downstream of the generator where an ion exchange bed is utilised, the bed comprised conditioned hydrous zirconium oxide prepared in accordance with the method described hereinbefore.

Example 1—pH Adjustment Effect

A gel generator having 2 grams of zirconium molybdate gel was eluted on each of 8 succeeding days with 10 mls of physiological saline solution. The pH of the eluate varied from 3.17 to 3.42.

An identical gel generator was connected to a 1 gm bed of hydrated zirconium oxide through which the eluate passed. The values obtained over the 8 daily elutions ranged from 5.12 to 6.25.

Example 2—Improvement in Radionuclidic purity in the Eluate

A large gel generator (150 gm gel) was eluted with 500 mL of saline solution. The table below sets out the analysis of the eluate for a sample taken directly from the generator and a sample which was first passed through a 6 gm bed of zirconium oxide. Although a small decrease in the technetium-99m activity occurred as a result of using the zirconium oxide bed, the radionuclidic purity was significantly increased.

| Radio- | Direct Sample | | Treated Sample | |
|---|---|---|---|---|
| nuclide | Activity | Percentage | Activity | Percentage |
| technetium-99 m | 10.400 GBq | 99.98866 | 9.830 GBq | 99.99927 |
| molybdenum-99 | 1.180 MBq | 0.01134 | 0.070 MBq | 0.00072 |
| rhenium-188 | 0.210 MBq | 0.00204 | 0.051 MBq | 0.00052 |
| tungsten-187 | 0.004 MBq | 0.00004 | 0.001 MBq | 0.00001 |
| niobium-92 m | 0.001 MBq | 0.00001 | 0.000 MBq | 0.00000 |

Example 3—Reduction in Nitrate Content

A 150 gm gel generator was eluted at daily intervals with 500 ml of water, the eluate being passed through a 3 gm bed of hydrous zirconium oxide to adsorb the technetium-99m. Subsequently, 30 ml of saline solution were passed through the bed to recover the technetium and the final eluate was analysed for nitrate concentration. Elutions were conducted on a daily basis. Most final nitrate concentrations were less than 5 micrograms/ml which is considered a satisfactorily low level.

Example 4—The Effect of Recycling Eluant

Identical generators containing 80 gm of gel were eluted, each with a 25 ml volume of water which was recycled six times. The table below gives the results achieved by using an ion exchange bed in series with the generator in contrast to a generator without such a bed. The bed comprised 1 gm of zirconium oxide.

| | A. Generator without bed | |
|---|---|---|
| Cycle | Activity eluted this cycle (%) | Total activity eluted (%) |
| 1 | 42.9 | 42.9 |
| 2 | 38.8 | 38.8 |
| 3 | 30.9 | 30.9 |
| 4 | 30.2 | 30.2 |
| 5 | 34.0 | 34.0 |
| 6 | 32.9 | 32.9 |

| | B. Generator with bed | |
|---|---|---|
| Cycle | Activity eluted this cycle (%) | Total activity eluted (%) |
| 1 | 42.3 | 42.3 |
| 2 | 31.4 | 73.7 |
| 3 | 12.2 | 85.9 |
| 4 | 4.4 | 90.3 |
| 5 | 1.7 | 92.0 |
| 6 | 1.2 | 93.2 |

Example 5—Concentration Effect of a Bed

A 150 gm gel generator was connected to a 1 gm bed of zirconium oxide and eluted with 200 ml of water. Two successive 10 ml volumes of saline solution were subsequently used to recover technetium from the bed and the results were as follows:

Activity of technetium-99m in generator eluate: 389.8 GBq

Technetium-99m activity in first saline eluate: 283.2 GBq

Technetium-99m activity in second 10 mL saline eluate: 38.5 GBq

Technetium-99m activity remaining in original eluate: 39.4 GBq

Technetium-99m activity retained on bed after saline elution: 28.7 GBq

Absorption efficiency of bed: 89.9%

Absorption/desorption efficiency in first saline elution: 72.7%

Absorption/desorption efficiency for combined saline elutions: 82.5%

Concentration increase of technetium-99m in first saline elution: 14.5

Concentration increase of technetium-99m with both saline elutions: 8.3

Example 6—Concentration Effect Using Recycling Technique

The experiment of Example 5 was repeated but using a 50 mL volume of water for eluting the generator through the bed in 4 cycles. This was effected 24 hours after the elution conducted in Example 5. The following results were obtained:

Absorption efficiency of the bed: 95.4%

Absorption/desorption efficiency first saline elution only: 85.2%

Absorption/desorption efficiency for combined saline elutions: 94%

Concentration increase of technetium-99m in first saline elution: 17.0

Concentration increase of technetium-99m in both saline elutions: 9.4

Example 7—Use of Two Small Beds

The potential advantage of using two small beds was demonstrated in an experiment in which 100 ml of technetium-99m solution were passed through a zirconium oxide bed of 0.75 gm. After measuring the total activity absorbed, elution was effected with 4 ml of saline solution and the following results were obtained:

Total activity absorbed by bed: 230800 counts/min

Activity of saline eluate: 115600 counts/min

Activity concentration: 28900 counts/min/ml

The experiment was repeated but with two beds of zirconium oxide in series respectively containing 0.3 gm and 0.45 gm of zirconium oxide. The results were as follows:

Total activity absorbed on 1st bed: 203400 counts/min

Total activity absorbed on 2nd bed: 28400 counts/min

Total activity absorbed: 231800 counts/min

Technetium was recovered by eluting each bed separately with 2 ml of saline solution with the following results:

Activity of first bed eluate: 124900 counts/min

Activity of second bed eluate: 9300 counts/min

Activity concentration first bed eluate: 62400 counts/min/ml

Activity concentration in second bed eluate: 4650 counts/min/ml

By using a combination of two smaller beds in series, the technetium-99m recovery rate was 16% greater than using one large bed, and the activity concentration in the first (smaller) of the two was 2.2 times the value obtained in the eluate of the single large bed.

We claim:

1. A method of treating an initial solution of pertechnetate in water comprising passing said initial pertechnetate solution through a bed of insoluble material having ion exchange properties for adsorbing the pertechnetate from said solution, and wherein the ion exchange material for said bed comprises a mixture of first and second hydrous metal oxide components, the first component being acid treated hydrous metal oxide and the second component being alkali treated hydrous metal oxide and in a second step passing an ionic eluant having smaller volume than said pertechnetate solution through the bed to remove the pertechnetate from the bed to provide a relatively concentrated and pure eluate solution, said ion exchange material in said bed and said ionic eluant having respective cooperating properties for providing said eluate with a pH in the range 4.0 to 8.0 and said bed retains thereon radionuclidic impurities in said initial solution.

2. A method as claimed in claim 1, wherein the hydrous metal oxide is zirconium oxide.

3. A method as claimed in claim 1 wherein said initial solution comprises the eluate from a portable technetium generator, and wherein the bed of insoluble material has a mass in the range 0.1 to 10 gm.

4. A method as claimed in claim 1, and wherein said bed comprises two portions arranged in series.

5. A method as claimed in claim 4, wherein the upstream portion of the bed has a smaller quantity of material than the downstream portion of the bed.

6. A method as claimed in claim 1 and including providing said aqueous initial pertechnetate solution by elution of a technetium generator with water and recycling the solution through the generator and the bed.

7. A method as claimed in claim 1 wherein the ionic eluant is physiological saline.

8. A method of producing a pertechnetate solution for radiopharmaceutical purposes comprising operating a technetium generator having a matrix which includes a mass of polymolybdate compound, the polymolybdate compound being of chemically bound molybdenum containing molbdenum-99 and being in a substantially non-elutable form, and the matrix permitting diffusion of technetium-99m therethrough and elution therefrom, eluting the generator with water to provide an aqueous initial pertechnetate solution and treating said solution in accordance with the method claimed in claim 1.

9. A method of treating an aqueous initial pertechnetate solution which is a solution of pertechnetate in water comprising passing the initial pertechnetate solution though a bed of insoluble amphoteric ion exchange material comprising hydrous metal oxide for adsorbing pertechnetate from said solution, and passing through the bed isotonic saline solution having a smaller volume than said pertechnetate solution for removing pertechnetate from the bed whereby a relatively concentrated and pure eluate solution is provided for radiopharmaceutical purposes, the ion exchange material having the characteristic of providing the eluate with a pH in the range 4.0 to 8.0 and said bed retaining thereon radionuclidic impurities from said initial solution.

* * * * *